(12) United States Patent
Yang et al.

(10) Patent No.: US 9,237,169 B2
(45) Date of Patent: Jan. 12, 2016

(54) NETWORK STREAM IDENTIFICATION FOR OPEN FACETIME

(75) Inventors: Yan Yang, San Jose, CA (US); Joe S. Abuan, San Jose, CA (US); Roberto Garcia, Sunnyvale, CA (US); Hyeonkuk Jeong, Saratoga, CA (US); Ming Derek Jin, Saratoga, CA (US); Berkat S. Tung, Rancho Cordova, CA (US); Barry A. Whitebook, Charles Town, WV (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 13/487,023

(22) Filed: Jun. 1, 2012

(65) Prior Publication Data

US 2013/0322626 A1    Dec. 5, 2013

(51) Int. Cl.
| | |
|---|---|
| H04K 1/00 | (2006.01) |
| H04L 29/06 | (2006.01) |
| G06F 15/173 | (2006.01) |
| G06F 15/16 | (2006.01) |

(52) U.S. Cl.
CPC ............ H04L 63/166 (2013.01); H04L 63/123 (2013.01); H04L 69/22 (2013.01)

(58) Field of Classification Search
CPC ..... H04L 63/123; H04L 63/166; H04L 12/56; H04L 65/608; H04L 69/22
See application file for complete search history.

(56) References Cited

U.S. PATENT DOCUMENTS

| | | | |
|---|---|---|---|
| 6,539,166 B2 | 3/2003 | Kawamura et al. | |
| 7,007,062 B1* | 2/2006 | Serenyi | H04L 29/06 709/203 |
| 7,724,682 B2 | 5/2010 | Kovacevic | |
| 2005/0076234 A1* | 4/2005 | Krtolica | H04L 63/0236 726/4 |
| 2005/0123001 A1 | 6/2005 | Craven et al. | |
| 2005/0265349 A1* | 12/2005 | Garg | H04L 29/06027 370/395.2 |
| 2006/0023718 A1* | 2/2006 | Joly | H04L 47/24 370/392 |
| 2007/0088834 A1* | 4/2007 | Litovski | H04L 63/0272 709/227 |
| 2008/0068448 A1* | 3/2008 | Hansen | H04N 7/15 348/14.09 |
| 2008/0253368 A1* | 10/2008 | Rasanen | H04L 65/607 370/389 |
| 2008/0307528 A1* | 12/2008 | Chen | H04L 47/10 726/26 |
| 2009/0285209 A1* | 11/2009 | Stewart | H04L 65/1006 370/389 |
| 2010/0014530 A1* | 1/2010 | Cutaia | H04L 12/66 370/401 |
| 2010/0278056 A1* | 11/2010 | Meloche | H04L 12/2602 370/252 |
| 2012/0257492 A1* | 10/2012 | Henry | H04L 1/004 370/216 |
| 2012/0284379 A1* | 11/2012 | Zievers | G06F 15/781 709/222 |
| 2012/0311686 A1* | 12/2012 | Medina | H04L 63/0807 726/7 |
| 2013/0039487 A1* | 2/2013 | McGrew | H04L 63/0435 380/44 |

FOREIGN PATENT DOCUMENTS

EP        2 276 192 A2    1/2011

* cited by examiner

*Primary Examiner* — Dede Zecher
*Assistant Examiner* — Trang Doan
(74) *Attorney, Agent, or Firm* — Sterne, Kessler, Goldstein & Fox P.L.L.C.

(57) ABSTRACT

A method and apparatus of a device that distinguishes multiplexed media and signaling data traffic is described. In an exemplary embodiment, the device receives, on a single port, a packet of the multiplexed data traffic, where the multiplexed data traffic includes a plurality of packets and each of the plurality of packets is one of a media packet and an encapsulated signaling packet. The device further examines an initial data element of a header of the received packet to determine if the received packet is one of a media packet and a signal packet. The device further forwards the packet to a corresponding module for further processing based on the examining.

20 Claims, 14 Drawing Sheets

NETWORK STREAM IDENTIFICATION FOR OPEN FACETIME

FIELD OF INVENTION

This invention relates generally to data networking and more particularly to identifying different network packet types communicated over a single port between a pair of devices.

BACKGROUND OF THE INVENTION

Modern network connections between applications running on a pair of devices will use a port to communicate data between these pair of devices. A port is an endpoint in a bidirectional communication flow across a computer network. An application communicates with a remote device through one or more ports.

While some applications can use different ports to communicate packets of different protocols, there are advantages to transmitting and receiving packets over the same port for multiple network protocols. For example, a FaceTime video call uses a single port for various signaling and media packets of different protocols. Protocols used include Session Initiation Protocol (SIP) to establish the call, Internet Connectivity Establishment (ICE) protocol to establish a session across firewall, and Real Time Protocol (RTP) to delivering real-time and encrypted media streams.

In order for different types of packets (e.g., SIP, ICE, and RTP packets) to be communicated across the same port, there is a need to differentiate the different types of packets so that a FaceTime client can appropriately process the different packet types.

SUMMARY OF THE DESCRIPTION

A method and apparatus of a device that of distinguishes multiplexed media and signaling data traffic is described. In an exemplary embodiment, the device receives, on a single port, a packet of the multiplexed data traffic, where the multiplexed data traffic includes a plurality of packets and each of the plurality of packets is one of a media packet and an encapsulated signaling packet. The device further examines an initial data element of a header of the received packet to determine if the received packet is one of a media packet and a signal packet. The device further forwards the packet to a corresponding module for further processing based on the examining.

In a further embodiment, a method and device that switches multiplexed data traffic received on a single port is described. The method receives, on a single port, a stream of the multiplexed data traffic, where the multiplexed data traffic includes a plurality of encapsulated signaling packets. In addition, each of the plurality of encapsulated packets is an encapsulated signaling packet of different network protocols and the multiplexed data traffic includes at least one of the encapsulated signaling packets for each of the different signaling protocols. The method further switches each of the plurality of encapsulated data packets to a corresponding module for further processing, the switching based on a header of that encapsulated data packet.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
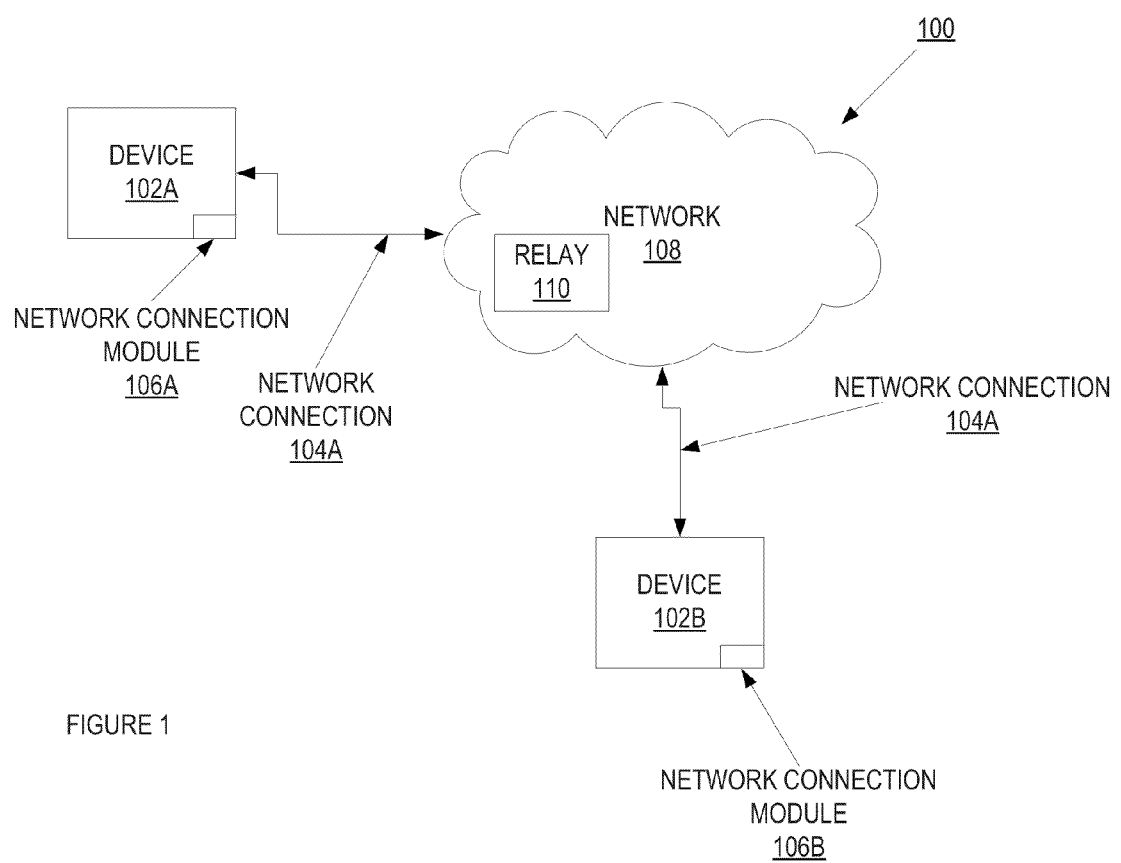
FIG. 1 is a block diagram of one embodiment of system that communicates data between two devices.

A method and apparatus of a device that distinguishes multiplexed media and signaling data traffic is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that distinguishes multiplexed media and signaling data traffic received on one port is described. The device receives, on a single port, a packet of the multiplexed data traffic. The device examines an initial data element of the header of the received packet to determine if the received packet is a media packet or a signaling packet. For example, the received packet could be an RTP packet, SIP packet, handshake packet, ICE packet, etc. If the packet is a media packet, the device forwards the packets to a media packet processing module. If the packet is a signaling packet, the device further examines other fields in the header to determine what type of signaling packet has been received. For example, the device examines the type field of the signaling packet to determine if the packet is a SIP, ICE, or handshake packet. In addition, the device strips the header from the packet and processes the according to the signaling packet type.

FIG. 1 is a block diagram of one embodiment of system that communicates data between two devices. In FIG. 1, the system 100 includes devices 102A-B that are coupled via network 108. While in one embodiment, network 108 is the Internet, in alternate embodiments, network 108 is another type of network (intranet, etc., or another type of network as known in the art). Devices 102 A-B can each be one of a mobile device (smartphone, laptop, personal digital assistant, music playing device, gaming device, etc.), personal computer, etc., or any other device capable of handling a media call (e.g., a FaceTime call). In one embodiment, device 102A includes one or more different interfaces that are used to communicate data with device 102B. For example and in one embodiment, device 102A may includes wireless interface (e.g., 802.11a/b/g/n, 802.16 WIMAX, etc. or other wireless interface as known in the art), cellular data interface (e.g. 3G CDMA, 3G UMTA, 4G/LTE, etc. or another cellular data interface as known in the art), and/or wired interface (Ethernet or another wired interface as known in the art). Similarly, device 102B may include one or more interfaces, such as wireless interface, cellular data interface, and/or wired interface.

Using these different interfaces, devices 102A-B uses a network connections 104A-B, respectively, to network 108. For a certain class of applications (e.g., peer to peer (P2P), video calls (e.g., FaceTime, etc.), voice calls, etc.), these applications use pairs of connections between device 102A-B. In one embodiment, the devices 104A-B conduct a FaceTime call over network connections 104A-B via network 108. In another embodiment, the devices 104A-B conduct a FaceTime call over network connections 104A-B via network 108 and relay 110.

In one embodiment, each of the devices 104A-B uses a number of different protocols to establish and perform a FaceTime call. In one embodiment, a FaceTime call is an audio/video call that allows users to talk and view each other between two devices. For example and in one embodiment, a device establishing and performing a FaceTime call, uses the ICE protocol to establish a network connection with the other device, uses a handshaking protocol to negotiate secure attributes of the FaceTime call, uses the SIP protocol to establish the FaceTime call, and the RTP to communicate audio and video data of the FaceTime call with the other device. In one embodiment, packets for each of these supported protocols are communicated with the device using a single port. By using a single port, it is less complex for the packets of the different network protocols to travel over a firewall or network address translation (NAT) device. In one embodiment, a device performing a FaceTime call, may also initiate a second call with the same or another device. In this embodiment, the device will be handling call setup packets as well as call media packets on that same port.

In one embodiment, in order to communicate packets of different protocols over a single port, the device communicating these packets will need to differentiate these packets such that the packets can be processed appropriately. For example and in one embodiment, the device identifies packets based on the data in the header of the packet. In one embodiment, the FaceTime module 106A-B in each device 104A-B identifies and processes the different types of packets. The FaceTime module 106A-B is further described in the FIG. 2 below.

In one embodiment, the FaceTime module 106A-B can take advantage of a relay to relay data between the devices. In one embodiment, a relay is a server or that is capable of transmitting packets on behalf of one endpoint to a different endpoint over the Internet. For example and in one embodiment, relay is a relay implementing Internet Engineering Task Force (IETF) Draft 5766 relay protocol.

Figure 2:
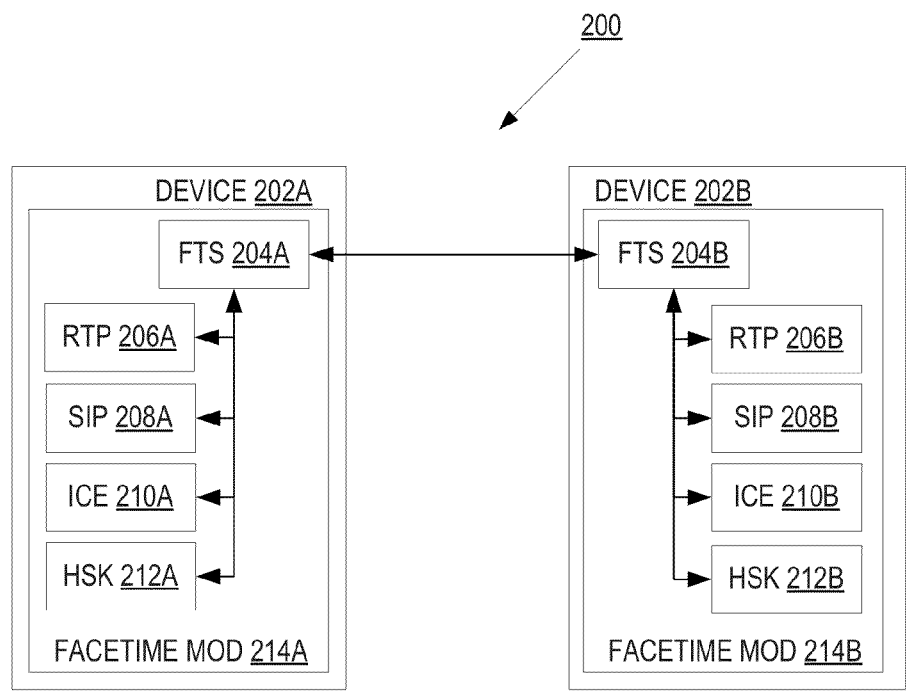
FIG. 2 is a block diagram of one embodiment of a pair of devices communicating data using multiple network packet types over one port.

FIG. 2 is a block diagram of one embodiment of a pair of devices 202A-B communicating data of multiple packet types over one port. In FIG. 2, devices 202A-B each includes a FaceTime module 214A-B that is used to perform a FaceTime call. In one embodiment, the each of the two FaceTime modules 214A-B includes a FaceTime switch module 204A-B, RTP module 206A-B, SIP module 208A-B, ICE module 210A-B, and HSK module 212A-B. In this embodiment, the FaceTime switch module 204A-B identifies the different types of packets and forwards the identified packets to the appropriate module. For example and in one embodiment, the FaceTime switch module 204A-B identifies and forwards different packets to the appropriate module. If the FaceTime switch module 204A-B identifies an RTP packet, the FaceTime switch module forwards this packet to the RTP module 206A-B. If the FaceTime switch module 204A-B identifies an SIP packet, the FaceTime switch module forwards this packet to the SIP module 208A-B. If the FaceTime switch module 204A-B identifies an ICE packet, the FaceTime switch module forwards this packet to the ICE module 210A-B. If the FaceTime switch module 204A-B identifies a handshake packet, the FaceTime switch module forwards this packet to the handshake module 212A-B.

In one embodiment, the FaceTime switch module 204A-B identifies the different types of packets based on information in the header of the packet. In one embodiment, the FaceTime switch module 204A-B identifies a packet based on the initial data element in the header of the packet. For example and in one embodiment, if the initial bit of the header is 0, the packet may be an Open FaceTime packet. If this initial bit is 1, the packet may be a RTP packet. In another embodiment, the FaceTime switch module 204A-B identifies the different type of packets based on a different criteria (packet length heuristic, detecting the relay header, checking the last four bytes for CRC-32, etc.). In one embodiment, packet has had lower layer encapsulation removed (e.g., Ethernet, IP, TCP or UDP layers, etc.) before the FaceTime switch module 204A-B identifies the packet.

Figure 3:
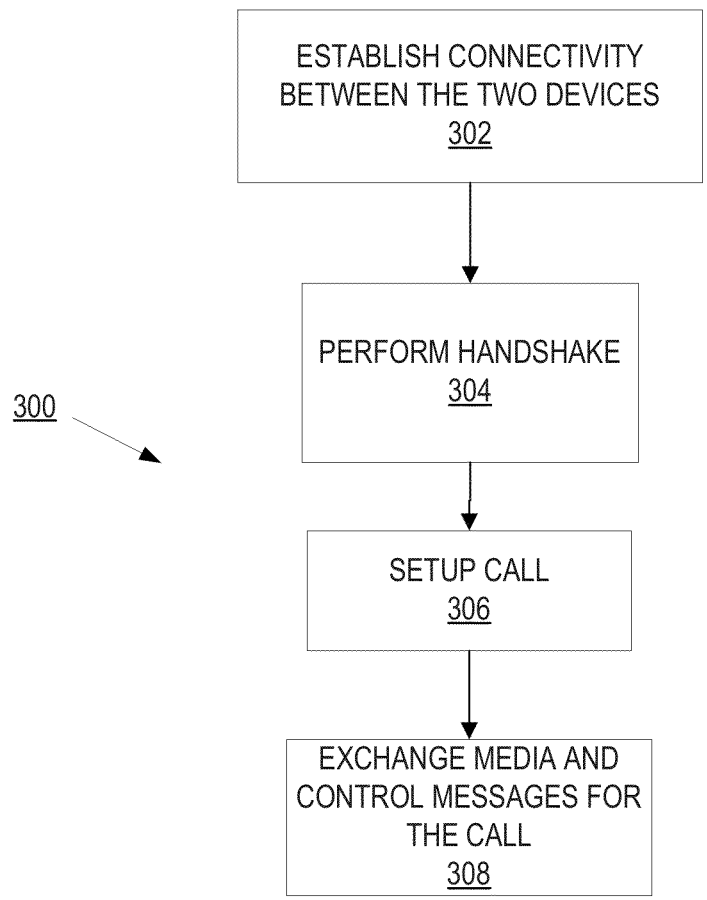
FIG. 3 is a flow diagram of one embodiment of a process to establish a FaceTime call between two devices.
Figure 9:
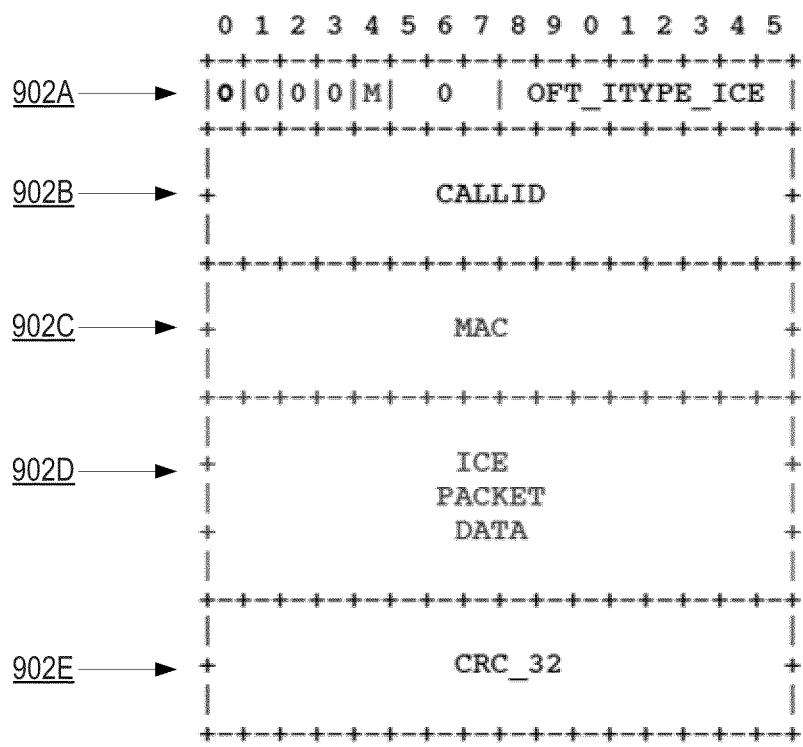
FIG. 9 is block diagram of one embodiment of an open FaceTime Internet Connectivity Establishment (ICE) packet.

FIG. 3 is a flow diagram of one embodiment of a process 300 to establish a FaceTime call between two devices. While in one embodiment, process 300 is used to establish a FaceTime call between a device and another device, in alternate embodiments, process 300 can be used by a device multiple times to handle multiple FaceTime calls between one or more other devices. In one embodiment, device 104A and/or 104B performs process 300 to establish a FaceTime call with another device. In FIG. 3, process 300 begins by establishing connectivity between two devices at block 302. In one embodiment, process 300 establishes connectivity by initiating a network connection discovery with a remote device. In one embodiment, the network connection discovery is performed by communicating with the remote device to understand which interface the remote device has available for creating connection pairs and further, transmit those interfaces to that remote device that are available on the device. In one embodiment, a device uses a protocol Internet Connectivity Establishment (ICE) transaction as known in the art to discover these connection pairs available between two devices. In this embodiment, an ICE transaction uses an open FaceTime packet that encapsulates an ICE packet as illustrated in FIG. 9 below. For example and in one embodiment, the connection is established to allow the handshaking to occur between the two devices. In one embodiment, these ICE messages are not encrypted and are authenticated via data in the Message Authentication Code (MAC) field of the ICE message.

At block 304, process 300 performs a handshake with the remote device. In one embodiment, process 300 exchanges open FaceTime handshake (HSK) messages with the remote device. For example and in one embodiment, process 300 is a DTLS client role and the remote device is the DTLS server role. In one embodiment, the open FaceTime HSK messages are not encrypted but are authenticated with the data in the MAC field of the FaceTime HSK messages. If the handshake is not successful, process 300 returns an error, times out, etc. Open FaceTime HSK messages are further described in FIG. 10 below.

Process 300 sets up the FaceTime call at block 306. In one embodiment, process 300 sets up the call by exchanging encrypted open FaceTime SIP messages. In this embodiment, these SIP messages establish an open FaceTime call by initiating/accepting the multi-media session, negotiating the audio and video capabilities. In one embodiment, unencrypted open FaceTime SIP messages are rejected. Open FaceTime SIP messages are further described in FIG. 11 below.

At block 308, process 300 exchanges media and control messages for the call. In one embodiment, process 300 expands a DTLS shared secret to provide a master encryption key. For example and in one embodiment, process 300 uses a Password-Based Key Derivation Function Hash-based Message Authentication Code Secure Hash Algorithm (PBKDF2-HMAC-SHA-1) function with the session identifier as a "salt" value to generate a master encryption key. In one embodiment, the master encryption key is used to generate the encryption and decryption keys for Secure Real Time Protocol (SRTP). This is done by expanding the master encryption key to form encryption and decryption keys for audio and video streams in both directions. In one embodiment, legacy FaceTime and Open FaceTime packets do not implement the SRTP Master Key Identifier (MKI) and authentication tag. In this embodiment, the encrypted open FaceTime SRTP packet with have the same byte size and format as an unencrypted RTP equivalent. Because these different types of packets have the same byte size, a heuristic based on packet length will be unable to differentiate an open FaceTime SRTP packet and an unencrypted RTP equivalent. In this embodiment, a different way of determining these different packets would be used, such as examining the headers of the each of the packets. Identifying different packets types is further described in FIG. 8 below.

Figure 4:
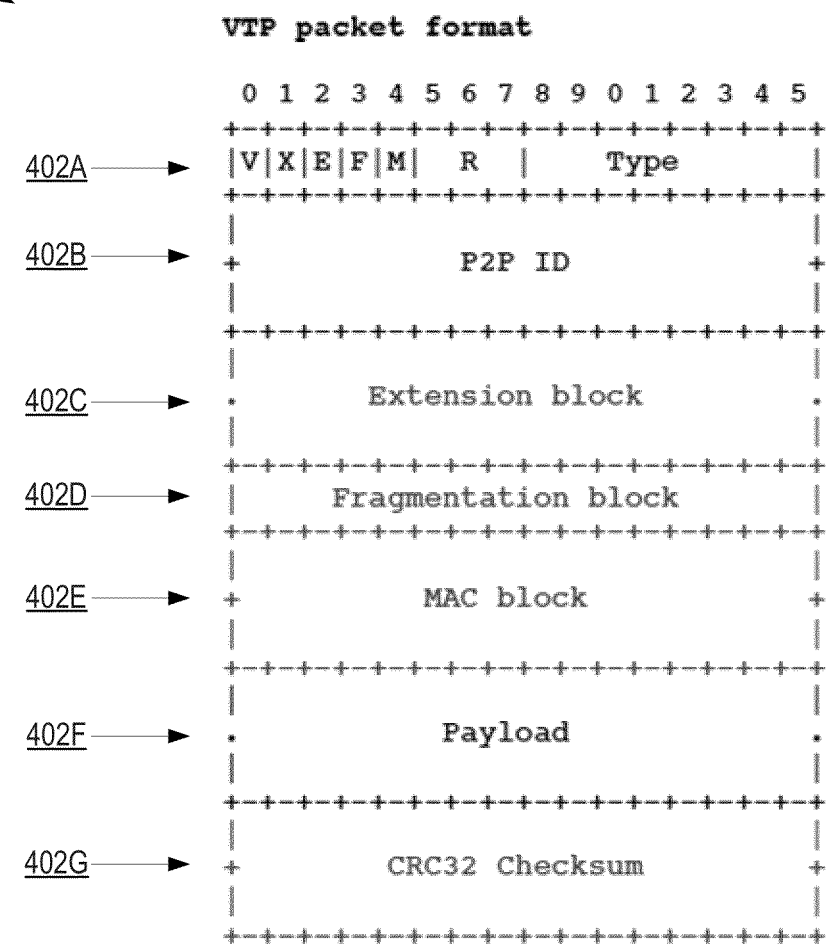
FIG. 4 is a block diagram of one embodiment of a VTP packet.

FIG. 4 is a block diagram of one embodiment of a virtual transport (VTP) packet format 400. In one embodiment, the VTP packet is a transport layer protocol and defines a packetization format. In one embodiment, open FaceTime packets are VTP packets and can be ICE, SIP, or HSK packet type. In one embodiment, the VTP packet format 400 includes a header of fields 402A-E, a payload 402F, and a CRC32 checksum 402G. In one embodiment, the header 402A-E includes the first 16 bits (402A), a peer identifier 402B, extension block 402C, fragmentation block 402D, and MAC block 402E. In one embodiment, the first 16 bits of the packet include a V bit, X bit, E bit, F bit, M bit, R bits, and a Type. The V bit identifies the packet as a FaceTime packet. If this bit is set to 0, the packet is a FaceTime packet. The next bit in 402A, X, identifies whether the packet includes an extension block 402C. If the X bit is set, the fixed part of the header (402A-B) is followed by an extension block 402C. The next bit, E, identifies if payload 402F is encrypted. If the E bit is set, the payload 402F is encrypted. The M bit is the MAC bit. The R bits are reserved. In one embodiment, there three bits for the R bits and these bits are set to 0. In addition, the VTP packet format includes a type. In one embodiment, the type is eight bits long and identifies the type of VTP packet. For example and in one embodiment, the VTP packet type can be an ICE, Handshake, or SIP packet.

In addition, the VTP packet includes a P2P ID 402B block, which holds the peer identifier. In one embodiment, the peer identifier is identifies the FaceTime call and is 32 bits long. For example and in one embodiment, the peer identifier is the session ID. In one embodiment, the session ID is randomly generated and used for the duration of the FaceTime call.

If the X bit is set, the VTP packet will include an extension block 402C. In one embodiment, the extension block 402C is a block that is used by a vendor to implement an extension to open FaceTime. For example and in one embodiment, a vendor may wish to implement extend the protocol to add reliability. In this embodiment, the vendor would use the extension block to contain the information for this extension. The extension block 402D is further described in FIG. 5 below.

The F bit identifies if the packet includes a fragmentation block 402D. If the F bit is set, a fragmentation block 402D will follow after the fixed header (402A-B) and extension block 402C (if there). In one embodiment, the fragmentation block 402D is used to break up data for a packet over multiple packets. In one embodiment, the fragmentation block 402D is used if the original packet to be transported in the VTP packet format does not fit in a single packet. The fragmentation block 402D is further described in FIG. 6 below.

The M bit identifies if the packet includes a MAC block 402E. If the M bit is set, a MAC block 402E will follow after the fixed header (402A-B), the extension block 402C (if there), and the fragmentation block 402D (if there). If present, the MAC block 402E includes the secret associated with the session ID that is used to hash the payload.

The payload 402F contains the message payload. In one embodiment, the contents of the payload depend on the type of VTP packet. For example and in one embodiment, a VTP packet can be ICE, HSK, SIP as in the open FaceTime packet defined below. In addition, the VTP packet format 400 includes a (Cyclic Redundancy Check) CRC checksum 402G. In one embodiment, the CRC checksum 402G is to error check the contents of the VTP packet. While in one embodiment, the checksum 402G illustrated is a CRC checksum, in alternate embodiments, different types of checksums can be used.

Figure 5:
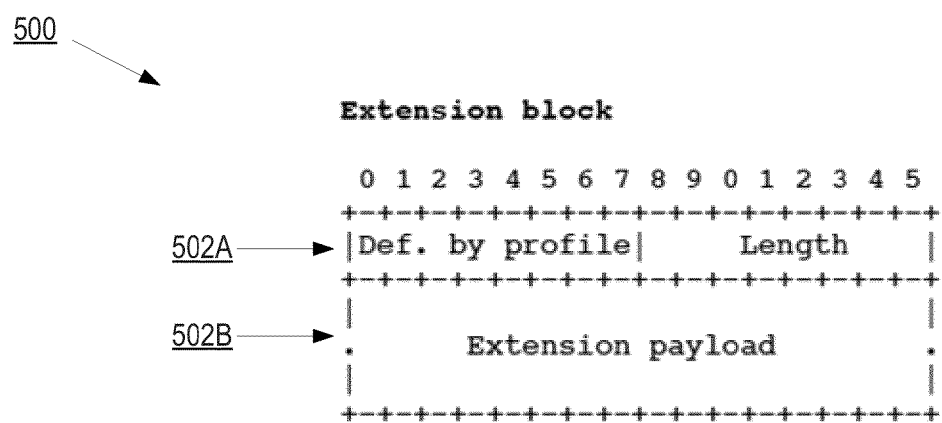
FIG. 5 is a block diagram of one embodiment of an extension block of a VTP packet.

As described above, a VTP packet can include an extension block. An extension block is used to implement an extension to open FaceTime. FIG. 5 is a block diagram of one embodiment of an extension block 500 of a VTP packet. In FIG. 5, the extension block 500 includes an extension header 502A and an extension payload 502B. The extension header 502A includes a "Def. by Profile" field that gives flexibility to Open FaceTime users to define proprietary information as an extension to the standard definition and a length field. The length gives the length of the extension payload 502B. The extension payload 502B includes the data for the extension.

Figure 6:
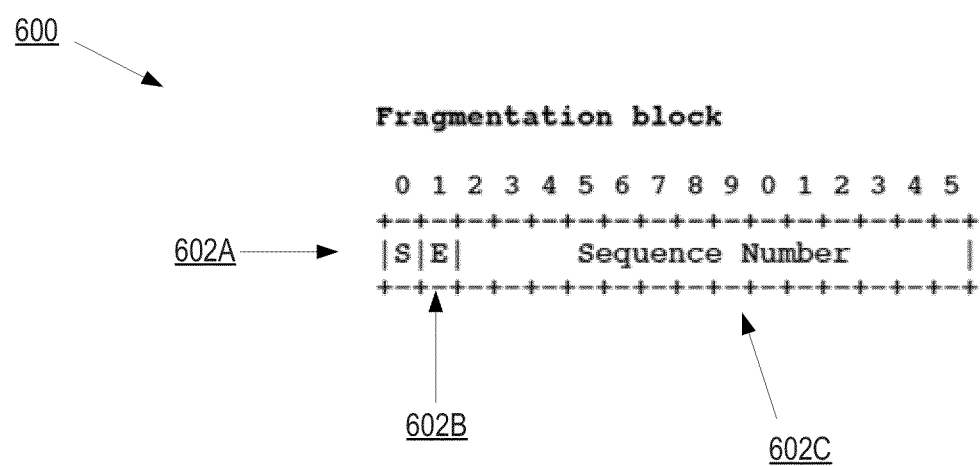
FIG. 6 is a block diagram of one embodiment of a fragmentation block of a VTP packet.

In addition, as described above, a VTP packet can include a fragmentation block. A fragmentation block is used to break up data for a packet over multiple packets. FIG. 6 is a block diagram of one embodiment of a fragmentation block of a VTP packet. In FIG. 6, the fragmentation block 600 includes an S bit 602A, an E bit 602B, and a sequence number 602C. In one embodiment, a packet larger than the network maximum transmission unit needs to be fragmented into smaller pieces that carry the same sequence number. The S bit 602A indicates the first piece in the group, and the E bit 602B indicates the last fragmented packet. In addition, the sequence number 602C includes a sequence number of the fragment.

Figure 7:
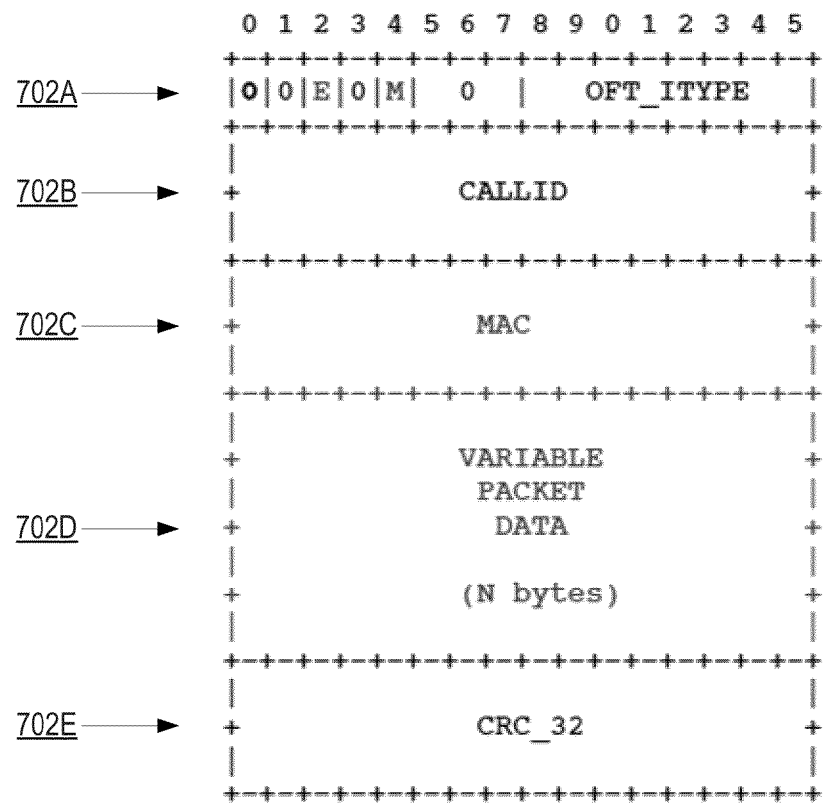
FIG. 7 is a block diagram of one embodiment of an open FaceTime packet.

FIG. 7 is a block diagram of one embodiment of an open FaceTime packet 700. In one embodiment, the open FaceTime packet format 700 includes a header of fields 702A-C, a payload 702D, and a CRC32 checksum 702E. In one embodiment, the header 702A-C includes the first 16 bits (702A), a CALLID field 702B, and a MAC block 702C. In one embodiment, the first byte of the packet 700 includes an E and M bit, and the second byte is an OPT_ITYPE field. In this embodiment, OPT_ITYPE is used to identify the type of Open FaceTime packet. In an Open FaceTime message, ICE and HSK packets have the E bit reset, and SIP message has the E bit to be set.

In addition, the header 702A-C includes the field OFT_I-TYPE. In one embodiment, this field stores data to indicate the type of open FaceTime packet. In one embodiment, the CALLID 702B field holds that call identifier for the FaceTime session. In one embodiment, the call identifier is identifies the FaceTime call and 32 bits long. For example and in one embodiment, the call identifier can be inherited from the FaceTime module 214A-B.

Furthermore, the header 702-C includes the MAC field 702C. While in one embodiment, the MAC field 702C is present in the open FaceTime packet 700 (e.g., if the M bit is set), in alternate embodiments the MAC field is not present in the open FaceTime packet 700 (e.g., if the M bit is not set). In addition, in one embodiment, the MAC field 702C includes data in the field where the first 32 bits of HMAC_SHA1 (variable_packet_data, N) in network-byte-order, keyed by FaceTime sessionID stored as a UTF8 c_string. In one embodiment, the MAC is the Message Authentication Code that is used to authenticate the packet.

In one embodiment, open FaceTime packet 700 includes the variable packet data 702D, which stores the packet data for the type of packet. In one embodiment, the size of the packet and the type of data stored in the packet is based on the packet type as indicated by the OFT_ITYPE field. For example and in one embodiment, if the OFT_ITYPE field indicates the packet is an OFT_ITYPE_ICE packet, the variable packet data contains packet data for an ICE packet and is of the length of an ICE packet. For example and in one embodiment, the packet data contains that of an ICE packet defined in RFC5245. In another example and embodiment, if the OFT_ITYPE field indicates the packet is an OFT_ITYPE-_HSK packet, the variable packet data contains packet data for an HSK packet and is of the length of an HSK packet. For example and in one embodiment, the packet can include a DTLS handshake data that is used to negotiate secure attributes of the FaceTime call. As a further example and a further embodiment, if the OFT_ITYPE field indicates the packet is an OFT_ITYPE_SIP packet, the variable packet data contains packet data for an SIP packet and is of the length of an SIP packet. For example and in one embodiment, the SIP packet may include a text-based SIP message, such as a SIP request or response. In this example, the SIP messages are used to establish audio/video media methods for an open FaceTime call. Furthermore, the SIP messages may be encrypted.

In one embodiment, the variable packet data 702D includes a packet of the type indicated in the OFT_ITYPE field. In this embodiment, open FaceTime packet 700 encapsulates a signaling packet of the type (SIP, HSK, ICE, etc.).

In one embodiment, the open FaceTime packet 700 includes the CRC_32 checksum field 702E. In this embodiment, the CRC checksum 702E is to error check the contents of the open FaceTime packet 700. While in one embodiment, the checksum 702E illustrated is a CRC checksum, in alternate embodiments, different types of checksums can be used. In one embodiment, the length of the CRC_32 checksum field is 32 bits. In one embodiment, if the last 32 bits of the packet do not include a valid CRC, this packet is not a valid open FaceTime packet. In this embodiment, the packet may be a valid packet of a different type (RTP audio/video packet, legacy packet type, etc.).

Figure 8:
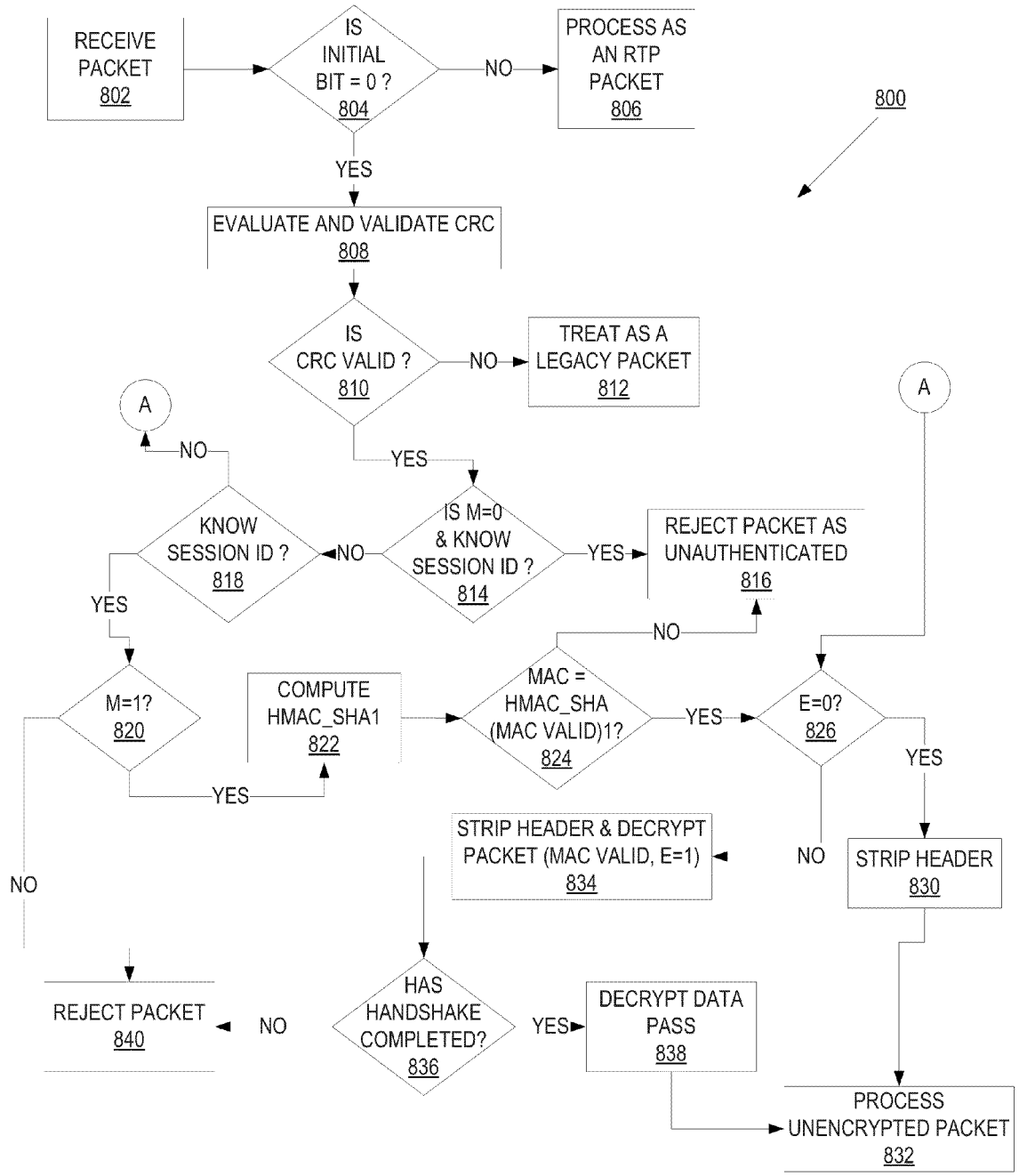
FIG. 8 is a flow diagram of one embodiment of a process that processes different packet types received on one port.

FIG. 8 is a flow diagram of one embodiment of a process 800 that different packet types received on one port. In FIG. 8, process 800 begins by receiving a packet at block 802. In one embodiment, the received packet can be an open FaceTime packet (e.g., open FaceTime ICE, open FaceTime handshake, open FaceTime SIP packets), or a different type of packets (e.g., RTP audio/video packet, legacy packet type, etc.). In this embodiment, process 800 receives the packet one the same port used for other packets involved in the FaceTime call. At block 804, process 800 determines if the initial bit of the received packet is zero. For example and in one embodiment, the received packet includes a header and a payload, where the header is stored before the payload. In this example, process 800 examines the initial bit of the header to determine if the initial bit is zero. If the initial bit is not zero, process 800 processes the packet as an RTP packet, at block 806.

If the initial bit is zero, at block 808, process 800 evaluates and validates the CRC in the received packet. In one embodiment, the CRC is stored in a field of the packet at the end of the packet. In this embodiment, process 800 examines the CRC field that is after the payload and determines if the CRC is a valid CRC. For example and in one embodiment, process 800 computes a CRC from the received packet and compares the computed CRC with the stored CRC. If these two CRC values match, process 800 has validated the stored CRC of the received packet. It the two values do not match, the CRC is not validated. If the CRC is not valid, at block 812, process 800 treats the received packet as a legacy packet. In one embodiment, the legacy packet could be an ICE packet that is of standard RFC 5245 format.

If the CRC is valid, at block 814, process 800 determines if the M field of the received packet is set to zero and if the session identification of the received packet is known. In one embodiment, the M field is used to identify the type of open FaceTime packet. For example and in one embodiment, an M field of zero could indicate the received packet is an open FaceTime HSK packet. In addition and in this embodiment, process 800 determines if the session identification is known. In one embodiment, process 800 determines is the session identifier is known by determining if the value in the CALLID field is known to process 800. For example and in one embodiment, process 800 could check the value in the CALLID field 702B as described in FIG. 7 above with session identifiers known to process 800. In this example, the known session identifiers could active FaceTime sessions.

If the M equals zero and the session identifier is known, at block 816, process 800 rejects the packet as unauthenticated. In one embodiment, process 800 rejects this packet because the remote side is expected to have this session id as well, so MAC section should be expected for authentication. If either the M field is not zero or the session identifier is not known, at block 818, process 800 determines if the session identifier is known. In one embodiment, process 800 determines if the session identifier is known by determining if the value in the CALLID field is known to process 800. For example and in one embodiment, process 800 could check the value in the CALLID field 702B as described in FIG. 7 above with session identifiers known to process 800. If the session identifier is not known, process 800 proceeds to block 826.

If the session identifier is known, process 800 determines if the M field of the received packet is equal to one. In one embodiment, if the M field of the received packet is equal to one, the packet may be an open FaceTime ICE packet or an open FaceTime SIP packet. If the M field of the received packet is not one (e.g., zero), process 800 rejects the packets. In one embodiment, process 800 rejects this packet because it is not a packet that process 800 recognizes.

If the M field of the received packet is equal to one, at block 822, process 800 computes the HMAC_SHA-1 value for the received packet. In one embodiment, process 800 calculates the HMAC_SHA-1 using the SHA1 algorithm and keyed with the session identifier. At block 824, process 800 compares the computed HMAC_SHA-1 value with the HMAC_SHA-1 value stored in the MAC field of the received packets. For example and in one embodiment, process 800 uses the first 32 bits of HMAC_SHA1 stored in the MAC field 702C as described in FIG. 7 above. If the computed HMAC_SHA1 is not equal to the HMAC_SHA-1 stored in the MAC field, process 800 rejects the packet as unauthenticated at block 816.

If the computed HMAC_SHA1 is equal to the HMAC_SHA-1 stored in the MAC field, process 800 determines if the MAC of the received packet is valid and if the E field of the received packet is equal to zero at block 826. In one embodiment, the MAC is validated by applying the same calculation on the packet content using the shared key and comparing the calculated value with the MAC value included in the packet. In one embodiment, if the E field of the received packet is equal to one, the received packet may be an open FaceTime SIP packet or an open FaceTime ICE packet. If the MAC is valid and the E field of the received packet is zero, at block 830, process 800 strips the header of the received packet. In one embodiment, process 800 strips the packet by removing the open FaceTime headers and CRC fields from the received packet. For example and in one embodiment, process 800 removes the header 702A, CALLID 702B, MAC 702C, and CRC 702E fields from the packet, leaving the variable packet data 702D. Process 800 processes this unencrypted packet at block 832. In one embodiment, if the packet has the M and E field to be one and zero respectively, process 800 will process the packet as an open FaceTime ICE packet.

If, at block 826, the E field is zero, at block 834, process 800 strips the header and decrypts the packet. In one embodiment, process 800 strips the packet by removing the open FaceTime headers and CRC. For example and in one embodiment, process 800 removes the header 702A, CALLID 702B, MAC 702C, and CRC 702E from the packet, leaving the variable packet data 702D. Furthermore, in this embodiment, process 800 decrypts the packet by a DTLS decryption scheme.

At block 836, process 800 determines if the handshake for the session identified by the packet is completed. In one embodiment, process 800 determines if the handshake is completed by checking if the handshake procedure has been carried out to completion. If the handshake is not completed, process 800 rejects the packet at block 840. If the handshake for the packet is completed, process 800 decrypts the packet at block 838. In one embodiment, process 800 decrypts the packet by a DTLS decryption scheme. Process 800 processes the unencrypted packet at block 832.

Figure 10:
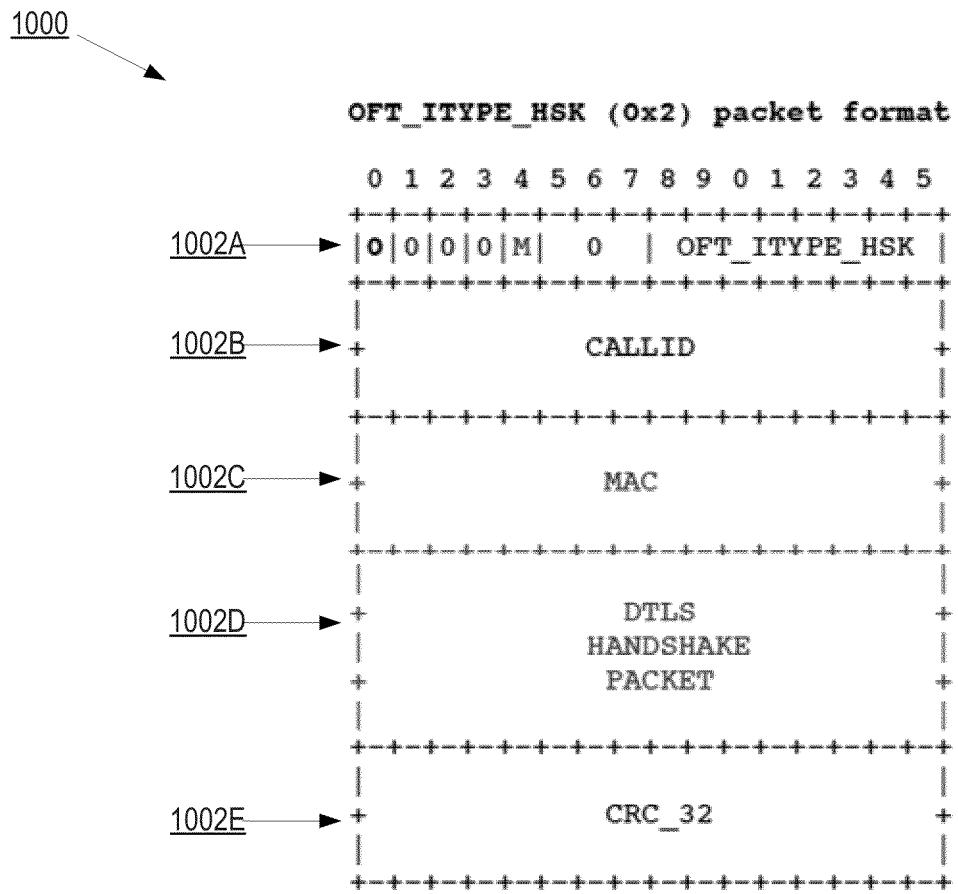
FIG. 10 is a block diagram of one embodiment of an open FaceTime handshake packet.
Figure 11:
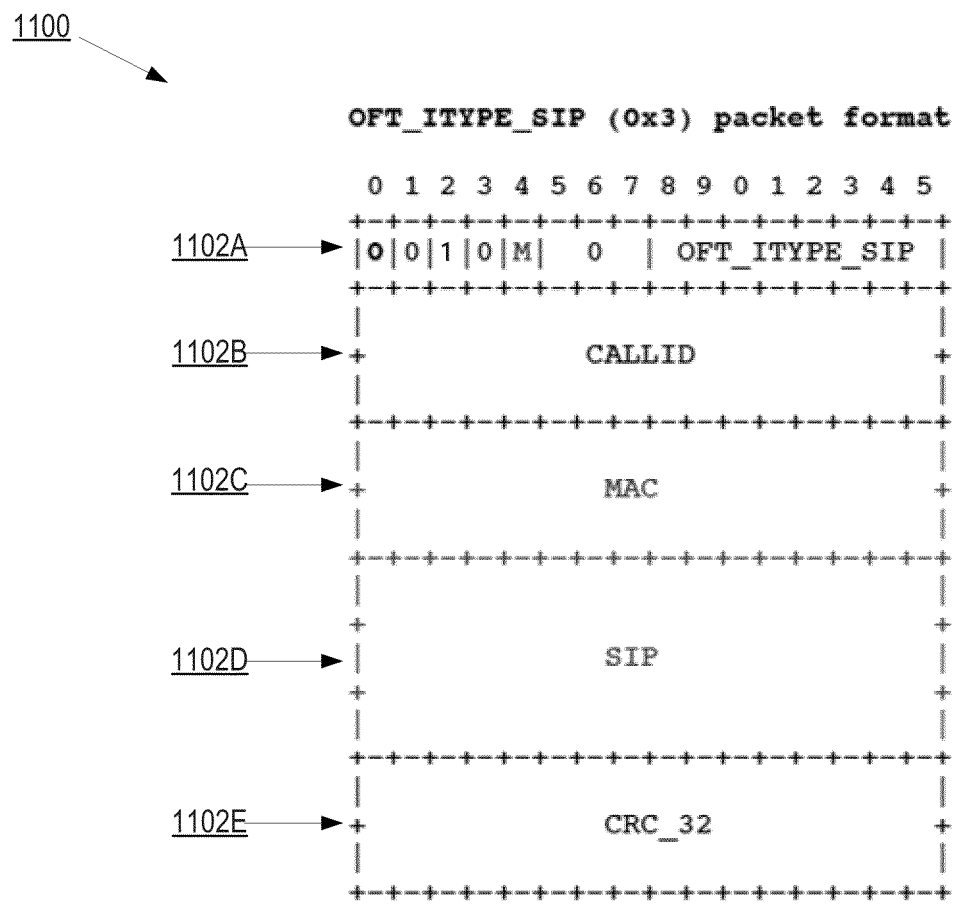
FIG. 11 is a block diagram of one embodiment of an open FaceTime Session Initiation Protocol (SIP) packet.

As described above, process 800 process three different types of open FaceTime packets: open FaceTime ICE packet, open FaceTime HSK packet, and open FaceTime SIP packet. FIGS. 9-11 illustrate different embodiments of these open FaceTime packet types.

FIG. 9 is block diagram of one embodiment of an open FaceTime ICE packet 900. In one embodiment, the open FaceTime ICE packet 900 includes a header of fields 902A-C, a payload 902D, and a CRC32 checksum 902E. In one embodiment, the header 902A-C includes the first 16 bits (902A), a CALLID field 902B, and a MAC block 902C. In one embodiment, the first 16 bits of the packet includes an M bit, and an OFT_ITYPE field. In this embodiment, the M bit is used to indicate if a MAC block is to follow. In one embodiment, the remaining seven of the first eight bits are zero.

In addition, the header 902A-C includes the field OFT_I-TYPE_ICE. This field is used to identify the packet as an open FaceTime ICE packet. For example and in one embodiment, the value 0x01 indicates an open FaceTime ICE packet. In one embodiment, the CALLID 902B field holds that call identifier for the FaceTime session. In one embodiment, the call identifier is identifies the FaceTime call and is 32 bits long.

Furthermore, the header 902A-C includes the MAC field 902C. While in one embodiment, the MAC field 902C is present in the open FaceTime ICE packet 900, in alternate embodiments the MAC field is not present in the open FaceTime ICE packet 900. In addition, in one embodiment, the MAC field 902C includes data in the field where the first 32 bits of HMAC_SHA1 (variable_packet_data, N) in network-byte-order, keyed by FaceTime sessionID as a UTF8 c_string.

In one embodiment, open FaceTime ICE packet 900 includes the variable packet data 902D for the ICE packet. For example and in one embodiment, the variable packet data format conforms to RFC 5245.

In one embodiment, the open FaceTime ICE packet 900 includes the CRC_32 checksum field 902E. In this embodiment, the CRC checksum 902E is to error check the contents of the open FaceTime ICE packet 900. While in one embodiment, the checksum 902E illustrated is a CRC checksum, in alternate embodiments, different types of checksums can be used. In one embodiment, the length of the CRC_32 checksum field is 32 bits. In one embodiment, if the last 32 bits of the packet do not include a valid CRC, this packet is not a valid open FaceTime packet. In this embodiment, the packet may be a valid packet of a different type (e.g., a legacy ICE packet type, etc.).

FIG. 10 is a block diagram of one embodiment of an open FaceTime handshake packet 1000. In one embodiment, the open FaceTime HSK packet 1000 includes a header of fields 1002A-C, a payload 1002D, and a CRC32 checksum 1002E. In one embodiment, the header 1002A-C includes the first 16 bits (1002A), a CALLID field 1002B, and a MAC block 1002C. In one embodiment, the first 16 bits of the packet includes an M bit, and an OFT_ITYPE field. In this embodiment, the M bit is used to indicate if a MAC block is to follow. In one embodiment, the remaining seven of the first eight bits are zero.

In addition, the header 1002A-C includes the field OFT_ITYPE_HSK. This field is used to identify the packet as an open FaceTime HSK packet. For example and in one embodiment, the value 0x02 indicates an open FaceTime ICE packet. In one embodiment, the CALLID 1002B field holds that call identifier for the FaceTime session. In one embodiment, the call identifier is identifies the FaceTime call and is 32 bits long.

Furthermore, the header 1002A-C includes the MAC field 1002C. While in one embodiment, the MAC field 1002C is present in the open FaceTime HSK packet 1000, in alternate embodiments the MAC field is not present in the open FaceTime HSK packet 1000. In addition, in one embodiment, the MAC field 1002C includes data in the field where the first 32 bits of HMAC_SHA1 (variable_packet_data, N) in network-byte-order, keyed by FaceTime sessionID stored as a UTF8 c_string.

In one embodiment, open FaceTime HSK packet 1000 includes the variable packet data 1002D for the HSK packet. In one embodiment, the variable packet data 1002D includes a DTLS handshake packet that is used to negotiate secure attributes of the FaceTime call.

In one embodiment, the open FaceTime HSK packet 1000 includes the CRC_32 checksum field 1002E. In this embodiment, the CRC checksum 1002E is to error check the contents of the open FaceTime HSK packet 1000. While in one embodiment, the checksum 1002E illustrated is a CRC checksum, in alternate embodiments, different types of checksums can be used. In one embodiment, the length of the CRC_32 checksum field is 32 bits. In one embodiment, if the last 32 bits of the packet do not include a valid CRC, this packet is not a valid open FaceTime HSK packet.

FIG. 11 is a block diagram of one embodiment of an open FaceTime SIP packet 1100. In one embodiment, the open FaceTime SIP packet 1100 includes a header of fields 1102A-C, a payload 1102D, and a CRC32 checksum 1102E. In one embodiment, the header 1102A-C includes the first 16 bits (1102A), a CALLID field 1102B, and a MAC block 1102C. In one embodiment, the first 16 bits of the packet includes an M bit, and an OFT_ITYPE field. In this embodiment, the M bit is used to indicate if a MAC block is to follow. In one embodiment, the E bit is set to 1, and the remaining six of the first eight bits are zeros.

In addition, the header 1102A-C includes the field OFT_ITYPE_SIP. This field is used to identify the packet as an open FaceTime SIP packet. For example and in one embodiment, the value 0x03 indicates an open FaceTime SIP packet. In one embodiment, the CALLID 1102B field holds that call identifier for the FaceTime session. In one embodiment, the call identifier is identifies the FaceTime call and is 32 bits long.

Furthermore, the header 1102A-C includes the MAC field 1102C. While in one embodiment, the MAC field 1102C is present in the open FaceTime SIP packet 1100, in alternate embodiments the MAC field is not present in the open FaceTime SIP packet 1100. In addition, in one embodiment, the MAC field 1102C includes data in the field where the first 32 bits of HMAC_SHA1 (variable_packet_data, N) in network-byte-order, keyed by FaceTime sessionID stored as a UTF8 c_string.

In one embodiment, open FaceTime SIP packet 1100 includes the variable packet data 1102D for the SIP packet. For example and in one embodiment, the SIP packet includes a text-based SIP message, such as a SIP request or response.

In one embodiment, the open FaceTime SIP packet 1100 includes the CRC_32 checksum field 1102E. In this embodiment, the CRC checksum 1102E is to error check the contents of the open FaceTime SIP packet 1100. While in one embodiment, the checksum 1102E illustrated is a CRC checksum, in alternate embodiments, different types of checksums can be used. In one embodiment, the length of the CRC_32 checksum field is 32 bits. In one embodiment, if the last 32 bits of the packet do not include a valid CRC, this packet is not a valid open FaceTime packet. In this embodiment, the packet may be a valid packet of a different type (e.g., legacy SIP packet type).

Figure 12:
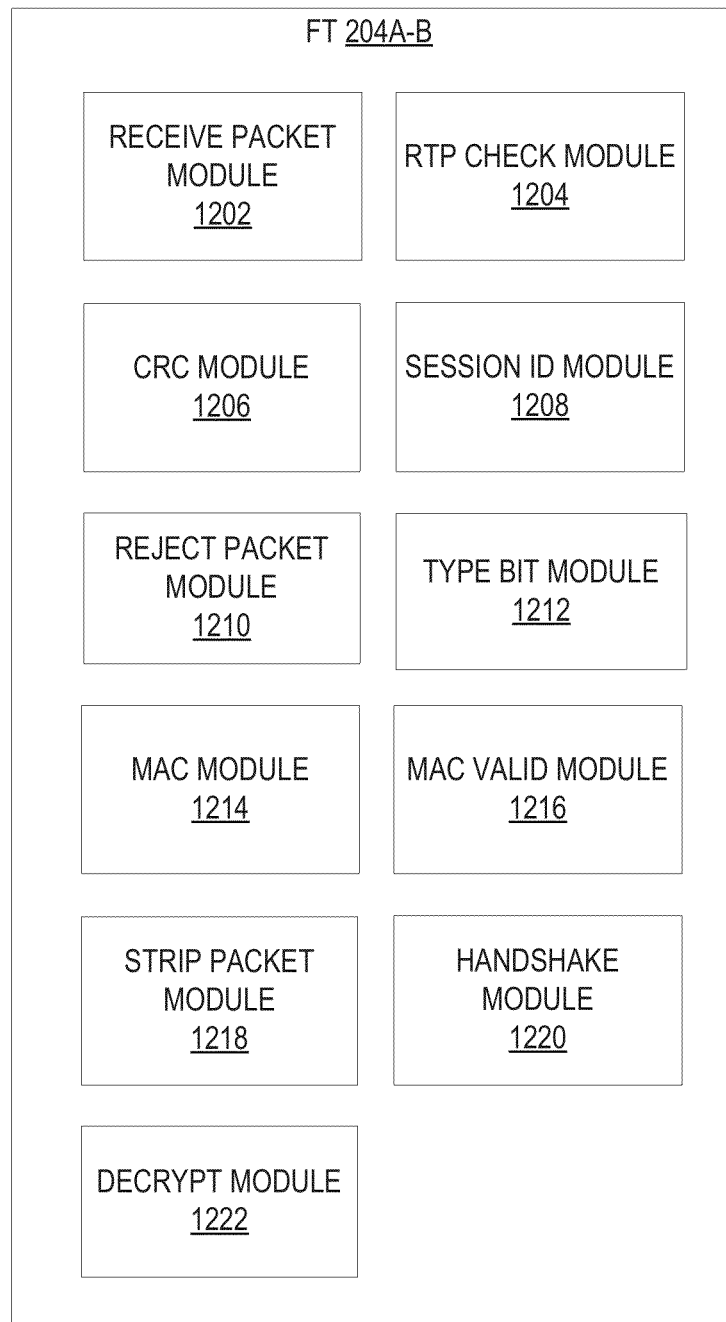
FIG. 12 is a block diagram of a FaceTime switch module to process a possible open FaceTime packet.

FIG. 12 is a block diagram of a FaceTime switch module 204A-B to process a possible open FaceTime packet. In one embodiment, the FaceTime switch module 204A-B includes receive packet module 1202, RTP check module 1204, CRC module 1206, session identifier module 1208, reject packet module 1210, type bit module 1212, MAC module 1214, MAC valid module 1216, strip packet module 1218, handshake module 1220, and decrypt module 1222. In one embodiment, the receive packet module 1202 receives the packet as described in FIG. 8, block 802 above. In one embodiment, the RTP check module 1204 checks to determine if the packet is an RTP packet or some other type of packet as described in FIG. 8, block 804 above. In one embodiment, the CRC module evaluates and validates the CRC of the packet as described in FIG. 8, block 806 above. In one embodiment, the session identifier module 1208 determines if the session identifier is known as described in FIG. 8, blocks 814 and 818 above. In one embodiment, the reject packet module 1210 rejects the packet as described in FIG. 8, blocks 816 and 840 above. In one embodiment, the type bit module 1212 determines the type bits as described in FIG. 8, blocks 814, 820, 826, and 828 above. In one embodiment, the MAC module 1214 computes the MAC values as described in FIG. 8, block 822 above. In one embodiment, the MAC valid module 1216 validates the computed MAC as described in FIG. 8, block 824 above. In one embodiment, the strip packet module 1218 strips the header from the packet as described in FIG. 8, blocks 830 and 834 above. In one embodiment, the handshake module 1220 determines if the handshake is completed as described in FIG. 8, block 836 above. In one embodiment, the decrypt module 1222 decrypts the packet data as described in FIG. 8, blocks 834 and 838 above.

Figure 13:
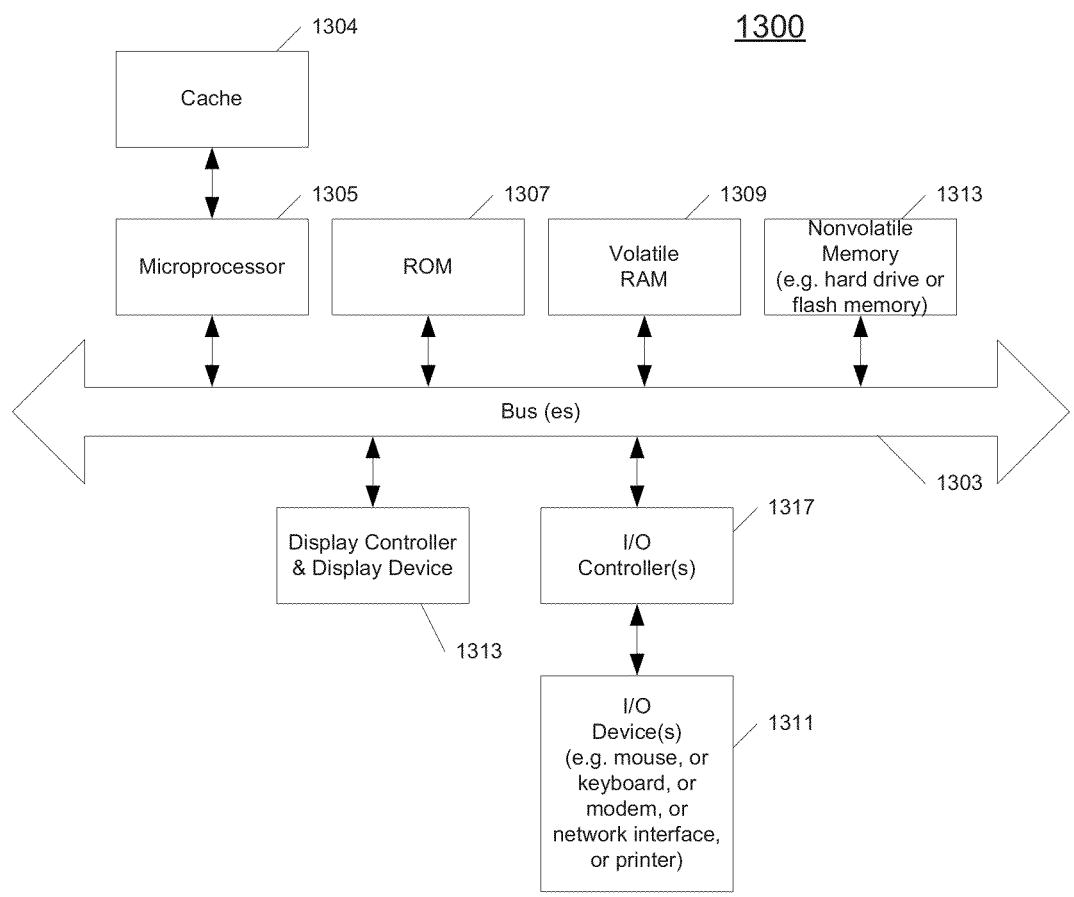
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including a device 102A-B as shown in FIG. 1. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1317. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Figure 14:
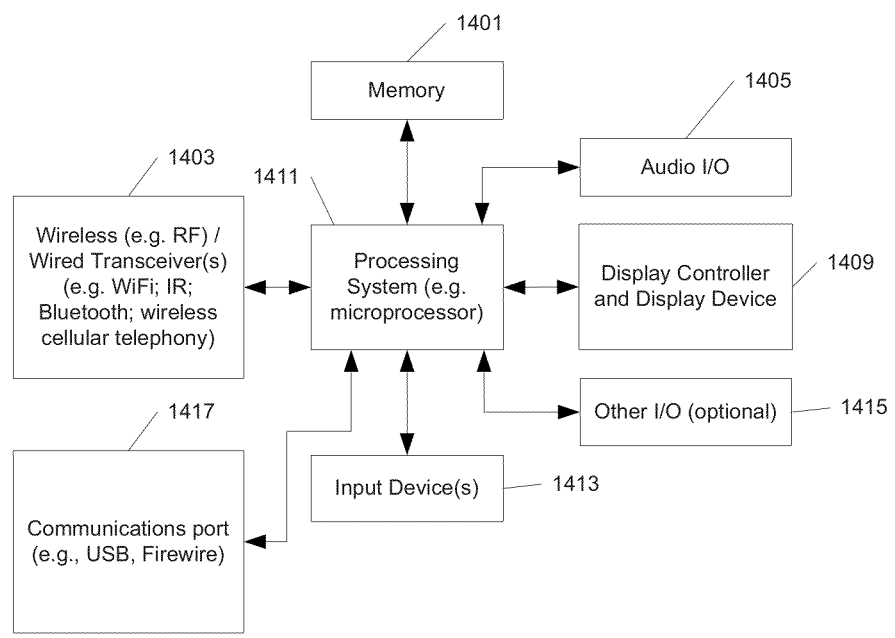
FIG. 14 shows an example of a data processing system, which may be used with one embodiment of the present invention.

FIG. 14 shows an example of another data processing system 1400 which may be used with one embodiment of the present invention. For example, system 1400 may be implemented as a device 102A-B as shown in FIG. 1. The data processing system 1400 shown in FIG. 14 includes a processing system 1411, which may be one or more microprocessors, or which may be a system on a chip integrated circuit, and the system also includes memory 1401 for storing data and programs for execution by the processing system. The system 1400 also includes an audio input/output subsystem 1405, which may include a microphone and a speaker for, for example, playing back music or providing telephone functionality through the speaker and microphone.

A display controller and display device 1409 provide a visual user interface for the user; this digital interface may include a graphical user interface which is similar to that shown on a Macintosh computer when running OS X operating system software, or Apple iPhone when running the iOS operating system, etc. The system 1400 also includes one or more wireless transceivers 1403 to communicate with another data processing system, such as the system 1400 of FIG. 14. A wireless transceiver may be a WLAN transceiver, an infrared transceiver, a Bluetooth transceiver, and/or a wireless cellular telephony transceiver. It will be appreciated that additional components, not shown, may also be part of the system 1400 in certain embodiments, and in certain embodiments fewer components than shown in FIG. 14 may also be used in a data processing system. The system 1400 further includes one or more communications ports 1417 to communicate with another data processing system, such as the system 1500 of FIG. 15. The communications port may be a USB port, Firewire port, Bluetooth interface, etc.

The data processing system 1400 also includes one or more input devices 1413, which are provided to allow a user to provide input to the system. These input devices may be a keypad a keyboard or a touch panel or a multi touch panel. The data processing system 1400 also includes an optional input/output device 1415 which may be a connector for a dock. It will be appreciated that one or more buses, not shown, may be used to interconnect the various components as is well known in the art. The data processing system shown in FIG. 14 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1400 may be a network computer or an embedded processing device within another device, or other types of data processing systems, which have fewer components or perhaps more components than that shown in FIG. 14.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "examining," "transmitting," "rejecting," "forwarding," "encapsulating," "de-encapsulating," "computing," "comparing," "stripping," "switching," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processors to perform a method of distinguishing multiplexed media and signaling data traffic, the method comprising:
   receiving, on a single port, a packet of the multiplexed data traffic, wherein the multiplexed data traffic includes a plurality of packets and each of the plurality of packets is one of a media packet or a signaling packet, each signaling packet being a virtual transport packet;
   examining an initial data element of a header of the received packet to determine if the packet is one of a media packet or a signal packet wherein the initial data element is a first bit of the header of the packet;
   forwarding the packet to a corresponding module for further processing based on the examining.

2. The non-transitory machine-readable medium of claim 1, wherein the media packet is a Real Time (RTP) protocol.

3. The non-transitory machine-readable medium of claim 1, wherein the virtual transport packet is an open FaceTime packet.

4. The non-transitory machine-readable medium of claim 3, wherein the virtual transport packet encapsulates an unencaspulated signaling packet.

5. The non-transitory machine-readable medium of claim 4, wherein a type of the unencapsulated signaling packet is selected from the group consisting of Session Initiation Protocol (SIP), handshake protocol, and Internet Connectivity Establishment (ICE) protocol.

6. The non-transitory machine-readable medium of claim 5, wherein the handshake protocol is Datagram Transport Layer Security (DTLS) protocol.

7. The non-transitory machine-readable medium of claim 4, further comprising:
   if the packet is an encapsulated signaling packet,
       determining a type of the unencapsulated signaling packet by examining a type field of the header of the packet; and
       removing the header of the packet.

8. The non-transitory machine-readable medium of claim 1, wherein the header includes a session identifier that identifies a FaceTime session associated with the packet.

9. The non-transitory machine-readable medium of claim 1, wherein the header includes a message authentication code field that stores a cryptographic hash for the packet.

10. The non-transitory machine-readable medium of claim 9, further comprising:
   computing a cryptographic hash for the packet;
   comparing the computed cryptographic hash with stored cryptographic hash in the message authentication code field of the packet; and
   rejecting the packet as unauthenticated if the computed cryptographic hash is not equal to the stored cryptographic hash.

11. The non-transitory machine-readable medium of claim 9, wherein the message authentication code field stores the first 32 bits of the cryptographic hash and the comparing compares the first 32 bits of the stored and computed cryptographic hash.

12. An apparatus that distinguishes multiplexed media and signaling data traffic, the apparatus comprising:
a single port that performs operations for:
receiving a packet of the multiplexed data traffic, wherein the multiplexed data traffic includes a plurality of packets, each of which is one of a media packet or a signaling packet, each signaling packet being a virtual transport packet;
a processor that performs operations for:
examining an initial data element of a header of the received packet to determine if the received packet is one of a media packet or a signaling packet;
when the packet comprises an encapsulated signaling packet, determining a type of the unencapsulated signaling packet by examining a type field of the header of the packet and removing the header of the packet; and
forwarding the packet to a corresponding module for further processing based on the examining.

13. The apparatus of claim 12, wherein the header includes a message authentication code field that stores a cryptographic hash for the packet.

14. The apparatus of claim 13, wherein the processor is further configured to perform operations for:
computing a cryptographic hash for the packet;
comparing the computed cryptographic hash with stored cryptographic hash in the message authentication code field of the packet; and
rejecting the packet as unauthenticated if the computed cryptographic hash is not equal to the stored cryptographic hash.

15. A method for distinguishing multiplexed media and signaling data traffic, the method comprising:
by a device having a processor:
receiving a packet of the multiplexed data traffic, wherein the multiplexed data traffic includes a plurality of packets, each of which is one of a media packet or a signaling packet, each signaling packet being a virtual transport packet;
examining an initial data element of a header of the received packet to determine if the received packet is one of a media packet or a signaling packet;
when the packet comprises an encapsulated signaling packet, determining a type of the unencapsulated signaling packet by examining a type field of the header of the packet and removing the header of the packet; and
forwarding the packet to a corresponding module for further processing based on the examining.

16. The method of claim 15, wherein the header includes a message authentication code field that stores a cryptographic hash for the packet.

17. The method of claim 15, further comprising:
computing a cryptographic hash for the packet;
comparing the computed cryptographic hash with stored cryptographic hash in the message authentication code field of the packet; and
rejecting the packet as unauthenticated if the computed cryptographic hash is not equal to the stored cryptographic hash.

18. The method of claim 15, wherein the media packet is a Real Time (RTP) protocol.

19. The method of claim 15, wherein the unencaspulated signaling packet is encapsulated in the virtual transport packet.

20. The method of claim 15, wherein a type of the unencapsulated signaling packet is selected from the group consisting of Session Initiation Protocol (SIP), handshake protocol, and Internet Connectivity Establishment (ICE) protocol.

\* \* \* \* \*

UNITED STATES PATENT AND TRADEMARK OFFICE
CERTIFICATE OF CORRECTION

PATENT NO.       : 9,237,169 B2
APPLICATION NO.  : 13/487023
DATED            : January 12, 2016
INVENTOR(S)      : Yang et al.

It is certified that error appears in the above-identified patent and that said Letters Patent is hereby corrected as shown below:

In the Claims:

Claim 1, column 16, line 24, "signal packet wherein" should read --signal packet, wherein--.

Signed and Sealed this
Twenty-third Day of August, 2016

Michelle K. Lee
*Director of the United States Patent and Trademark Office*